(12) United States Patent
Cheng et al.

(10) Patent No.: US 8,433,185 B2
(45) Date of Patent: Apr. 30, 2013

(54) MULTIPLE ANTI-SHAKE SYSTEM AND METHOD THEREOF

(75) Inventors: Yu-Ming Cheng, Hsinchu (TW); Yun-Chin Li, New Taipei (TW); Chin-Lung Yang, Toufen Township (TW); Yu-Kai Kang, Hsinchu (TW)

(73) Assignee: Altek Corporation, Hsinchu (TW)

( * ) Notice: Subject to any disclaimer, the term of this patent is extended or adjusted under 35 U.S.C. 154(b) by 163 days.

(21) Appl. No.: 13/093,270

(22) Filed: Apr. 25, 2011

(65) Prior Publication Data

US 2012/0141101 A1 Jun. 7, 2012

(30) Foreign Application Priority Data

Dec. 1, 2010 (TW) .............................. 99141625 A

(51) Int. Cl.
*G03B 17/00* (2006.01)
*H04N 2/228* (2006.01)
*G02B 27/64* (2006.01)

(52) U.S. Cl.
USPC .............. 396/55; 396/53; 396/54; 348/208.2; 348/208.5; 348/208.6; 348/208.11; 348/208.12; 359/557

(58) Field of Classification Search ................... 396/55, 396/52–54; 348/208.99, 208.1, 208.2, 208.4, 348/208.5, 208.6, 208.7, 208.8, 208.11, 208.12, 348/208.13; 359/554–557
See application file for complete search history.

(56) References Cited

U.S. PATENT DOCUMENTS

2008/0166115 A1* 7/2008 Sachs et al. .................... 396/55
2008/0291300 A1* 11/2008 Hitomi et al. ................. 348/241

* cited by examiner

*Primary Examiner* — Rochelle-Ann J Blackman
(74) *Attorney, Agent, or Firm* — Wang Law Firm, Inc.; Li K. Wang; Stephen Hsu

(57) ABSTRACT

A multiple anti-shake system and a method thereof applied to a camera device. The system comprises a sensing module, a first anti-shake module and a second anti-shake module. The sensing module detects the vibration signal of the camera device and the first anti-shake module is actuated to perform a first vibration compensation according to the vibration signal, therefrom calculates a residual vibration amount according to said first vibration compensation. The second anti-shake module thereby further performs a second vibration compensation to determine the set parameter of multi-frame blending. Thereby, the user can obtain a clear image by immediately processing a blurred image through a compensation process.

14 Claims, 5 Drawing Sheets

MULTIPLE ANTI-SHAKE SYSTEM AND METHOD THEREOF

FIELD OF THE INVENTION

The present invention relates to a multiple anti-shake system and a method thereof, and particular to a multiple anti-shake system and a method thereof that calculate the residual vibration amount to actuate multi-frame blending by optical-type anti-shake module.

BACKGROUND OF THE INVENTION

Most traditional digital camera devices, especially those of light and thin form, suffer from shaking during taking picture. Owing to the lack of stability when user holds the digital camera, the cameras often shake at the shutter-pressing moment, and result in blurred images.

To solve such shaking problem, an optical-type anti-shake module comprising an angular velocity sensor and a position sensor, is disposed in a camera device, to detect the angular variation data and position variation data of the camera device respectively during the movement, and generate a corresponding sensing signal thereof for further vibration compensation. The angular velocity sensor, such as a gyro sensor, is used to detect the angular degree, angular velocity, and angular acceleration variation data of the camera device during the movement. The position sensor, such as a Hall effect sensor, is used to detect the position variation data of the camera device during the movement. By the foregoing method, and further by calculating the displacement quantity that needs to be compensated with the detected data and by using the compensation lens to compensate according to the shake direction and displacement quantity, the optical-type anti-shake module is capable of solving the camera shake problem. However, the compensation ability of the optical-type anti-shake module is limited. When the vibration is greater than a degree that the optical-type anti-shake module can cover, blurred images will be resulted.

Multi-frame blending technique usually uses fixed set parameters, such as changing the exposure time of images or changing blending image amount, to process the multiple images after shooting by blending them in order to get a clear image. However, in some cases, it is not necessary to actuate the multi-frame blending technique, or to actuate the multi-frame blending technique with the preset number of images to get a clear image. The undifferentiated actuation of said technique causes a burden on the processor and a long waiting time of the users that the image process requires.

SUMMARY

In order to overcome the deficiencies of the preceding prior art, an object of the present invention is to provide a multiple anti-shake system and a method thereof in order to solve the problems of hand shake and blurred image.

With the above object in mind, the present invention provides a multiple anti-shake system applied to a camera device comprising a sensing module, a first anti-shake module and a second anti-shake module thereof. The sensing module detects the vibration signal of the camera device and the first anti-shake module is actuated to perform a first vibration compensation, therefrom calculates a residual vibration amount according to said first vibration compensation. The second anti-shake module thereby further performs second vibration compensation to determine the set parameter of multi-frame blending.

Wherein, the sensing module can be a position sensor or an angular velocity sensor.

Wherein, the vibration signal includes angular variation data or position variation data.

Wherein, the first anti-shake module is capable of performing said first vibration compensation by moving the lenses or photo-sensitive components of camera device according to the vibration signal.

Wherein, the residual vibration amount is the vibration amount that is not compensated in the first vibration compensation by the first anti-shake module.

Wherein, the second anti-shake module is capable of performing said second vibration compensation according to the residual vibration amount.

Wherein, the set parameter includes the exposure time or blending image amount.

With the above object in mind, the present invention provides a multiple anti-shake method applied to a camera device comprising the steps of: detecting a vibration signal of the camera device with the sensing module; performing a first vibration compensation with the first anti-shake module according to the vibration signal; calculating a residual vibration amount with the first anti-shake module according to said first vibration compensation; and performing a second vibration compensation with the second anti-shake module according to the residual vibration amount to determine a set parameter of the multi-frame blending.

Wherein, the sensing module is a position sensor or an angular velocity sensor.

Wherein, the vibration signal includes angular variation data or position variation data.

Wherein, the first anti-shake module is capable of performing said first vibration compensation by moving the lenses or photo-sensitive components of a camera device according to the vibration signal.

Wherein, the residual vibration amount is the vibration amount that is not compensated in the first vibration compensation by the first anti-shake module.

Wherein, the second anti-shake module is capable of performing said second vibration compensation according to the residual vibration amount.

Wherein, the set parameter includes the exposure time or blending image amount.

With the above object in mind, the present invention further provides a multiple anti-shake system applied to a camera device comprising a sensing module, an anti-shake module and a multi-frame blending module thereof. The sensing module detects the vibration signal of the camera device. The anti-shake module is actuated to perform vibration compensation, and calculate a residual vibration amount according to said vibration compensation. The multi-frame blending module thereby further performs a multi-frame blending according to the residual vibration amount.

Wherein, the multi-frame blending module further determines the set parameter of multi-frame blending, which includes the exposure time or blending image amount.

Wherein, the optical-type anti-shake module is capable of performing said vibration compensation by moving the lenses or photo-sensitive components of camera device according to the vibration signal.

As the foregoing, the multiple anti-shake system and the method thereof of the present invention have the following advantages:

(1) It is capable of getting clear images by actuating the multi-frame blending technique.

(2) It is capable of getting clear images by combining optical-type anti-shake and multi-frame blending techniques.

BRIEF DESCRIPTION OF THE DRAWINGS

The detail structure, the applied principle, the function and the effectiveness of the present invention can be more fully understood with reference to the following description and accompanying drawings, in which.

DETAILED DESCRIPTION

Figure 1:
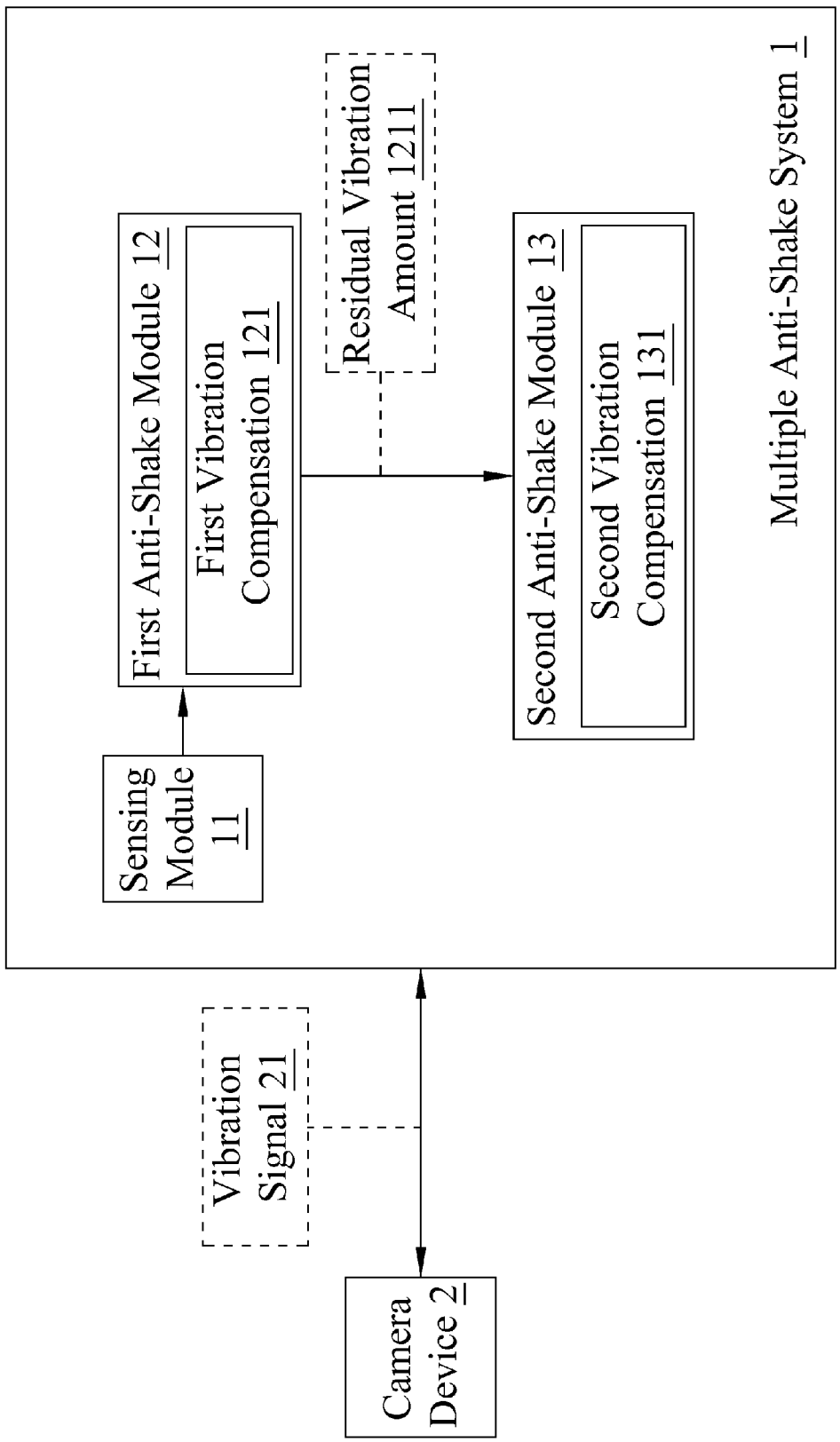
FIG. 1 is a schematic view of the multiple anti-shake system according to the present invention.

The camera device of the present invention can be a portable electronic device such as a digital camera, camera phone, personal digital assistant (PDA), or digital video camera. The above and further objects and novel features of the invention will more fully appear from the following detailed description when the same is read in connection with the accompanying drawing. It is to be expressly understood, however, that the drawing is for purpose of illustration only and is not intended as a definition of the limits of the invention.

Referring to FIG. 1, the present invention provides a multiple anti-shake system 1 applied to a camera device 2 which is capable of capturing images and generating image data. The camera device 2 further comprises lenses and photosensitive components such as complementary metal-oxide-semiconductors (CMOS), charge-coupled device (CCD), analogue/digital circuits or image processors. The multiple anti-shake system 1 comprises a sensing module 11, a first anti-shake module 12 and a second anti-shake module 13 thereof. The sensing module 11 detects a vibration signal 21 of the camera device 2. The first anti-shake module 12 thereby performs a first vibration compensation 121 according to the vibration signal 21, and therefrom calculates a residual vibration amount 1211 according to said first vibration compensation 121. The second anti-shake module 13 thereby performs a second vibration compensation 131 according to the residual vibration amount 1211 and therefrom determines the set parameter of multi-frame blending.

Figure 2:
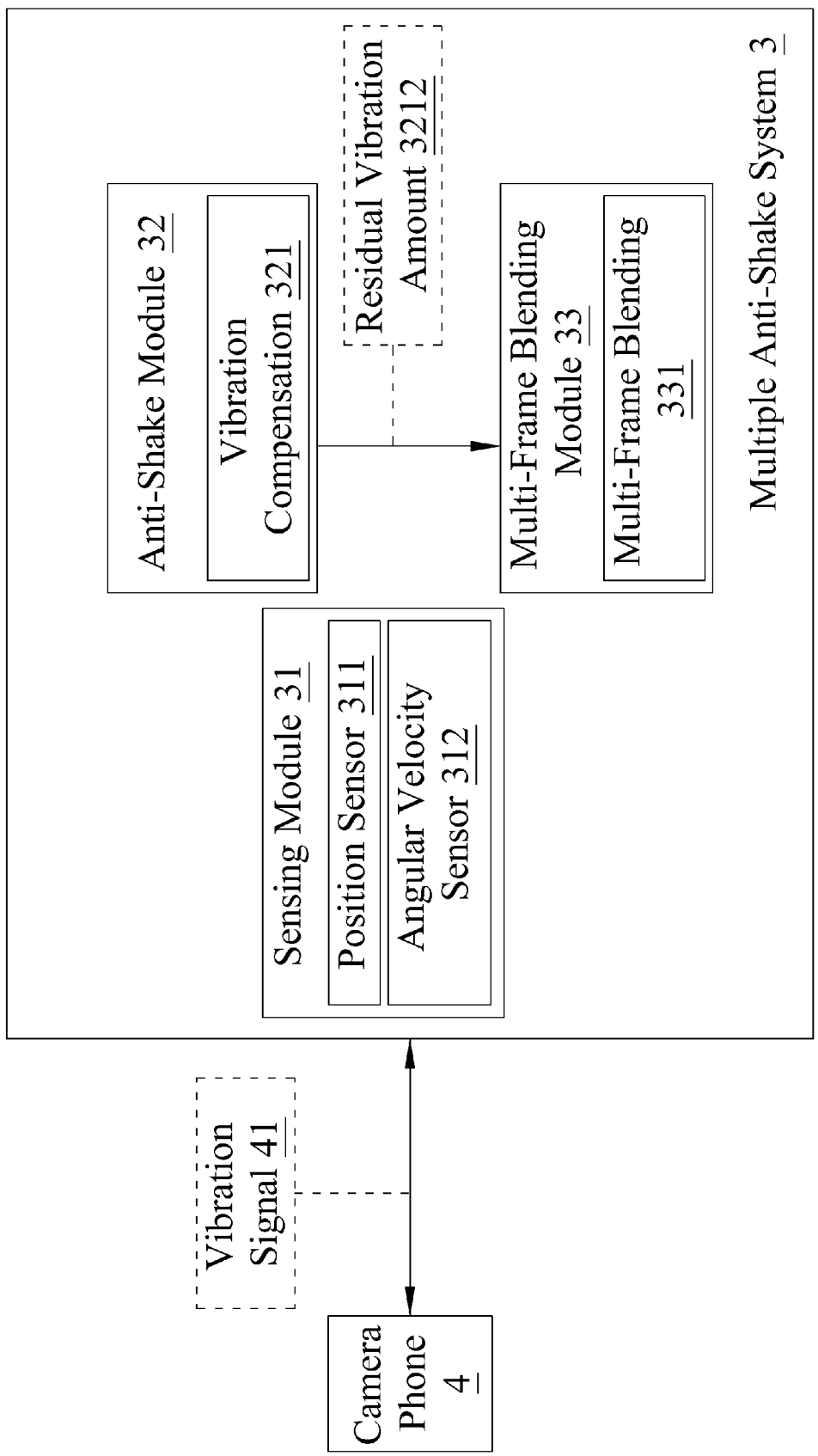
FIG. 2 is a schematic view of a first embodiment of a multiple anti-shake system according to the present invention.

Referring to FIG. 2, a camera phone in accordance with the first preferred embodiment of the present invention is illustrated. A multiple anti-shake system 3 applied to a camera phone 4 comprises a sensing module 31, an anti-shake module 32 and a multi-frame blending module 33 thereof. The sensing module 31 comprises a position sensor 311 or an angular velocity sensor 312, wherein the sensing module 31 is capable of detecting the vibration signal 41 of the camera phone 4. The sensing module 31 is further capable of detecting position variation data of the camera phone 4 via the position sensor 311 or detecting angular velocity variation data of the camera phone 4 via the angular velocity sensor 312.

The anti-shake module 32 is capable of performing a vibration compensation 321 by moving the lenses or photo-sensitive components of the camera phone 4 according to the vibration signal, and therefrom calculates a residual vibration amount 3212 according to said vibration compensation 321. Said residual vibration amount 3212 is the vibration amount that is not compensated in the vibration compensation by the anti-shake module 32. In addition, the anti-shake module 32 can be an optical-type anti-shake module capable of performing a mechanical-type vibration compensation.

The multi-frame blending module 33 is capable of actuating a multi-frame blending 331 according to said residual vibration amount 3212, therefrom determines the set parameter of multi-frame blending 331, which includes the exposure time or blending image amount.

It is noted that during the procedure of the multi-frame blending, if an image to be blended (referred to as a temporal image hereinafter) cannot be correctly blended to a reference image (referred to as a temporal reference image hereinafter), which is caused by the bias of geometric transformation parameter between a temporal image and a temporal reference image or the variation of partial objects in the temporal image being too large, hence the difference between the temporal image and the temporal reference image is therefrom too big for blending. The multi-frame blending module 33 is capable of blending the temporal images that can be correctly blended and removing those cannot, thereby solving the preceding problem. Although the brightness of the blending result may not reach expectation, users can still achieve the preset goal by image processing. Moreover, if the bias is a result of partial object variations, users are capable of deciding whether to continue shooting or not according to the size of the bias. When the partial variation is of a small range, users can continue shooting and solve the preceding problem by a method like the ghost cancellation to get clear images.

Figure 3:
FIG. 3 is a schematic view of an embodiment of the optical-type anti-shake system according to the present invention.

Referring to FIG. 3, the working range and tracking ability of the sensing module 31 and the anti-shake module 32 are combined to extend the stability range of getting clear images from blurred images. In other words, since the shutter time of the anti-shake module 32 is higher than general safe shutters, it is capable of shooting images obtained by a longer exposure time. The anti-shake module 32 is used within the scope of its applicability, and exceeding the working range and the tracking ability of the anti-shake module 32, the part that can be processed by it is set to be the lowest exposure time (the effective safe shutter). The multi-frame blending module 33 is thereby actuated according to a residual vibration amount 3212 to blend the images and determine the set parameter of multi-frame blending as the exposure time or blending image amount.

Although the foregoing has already stated the multiple anti-shake method clearly while describing the said system therefrom, flow charts are still provided to make sure the method thereof is clearly described.

Figure 4:
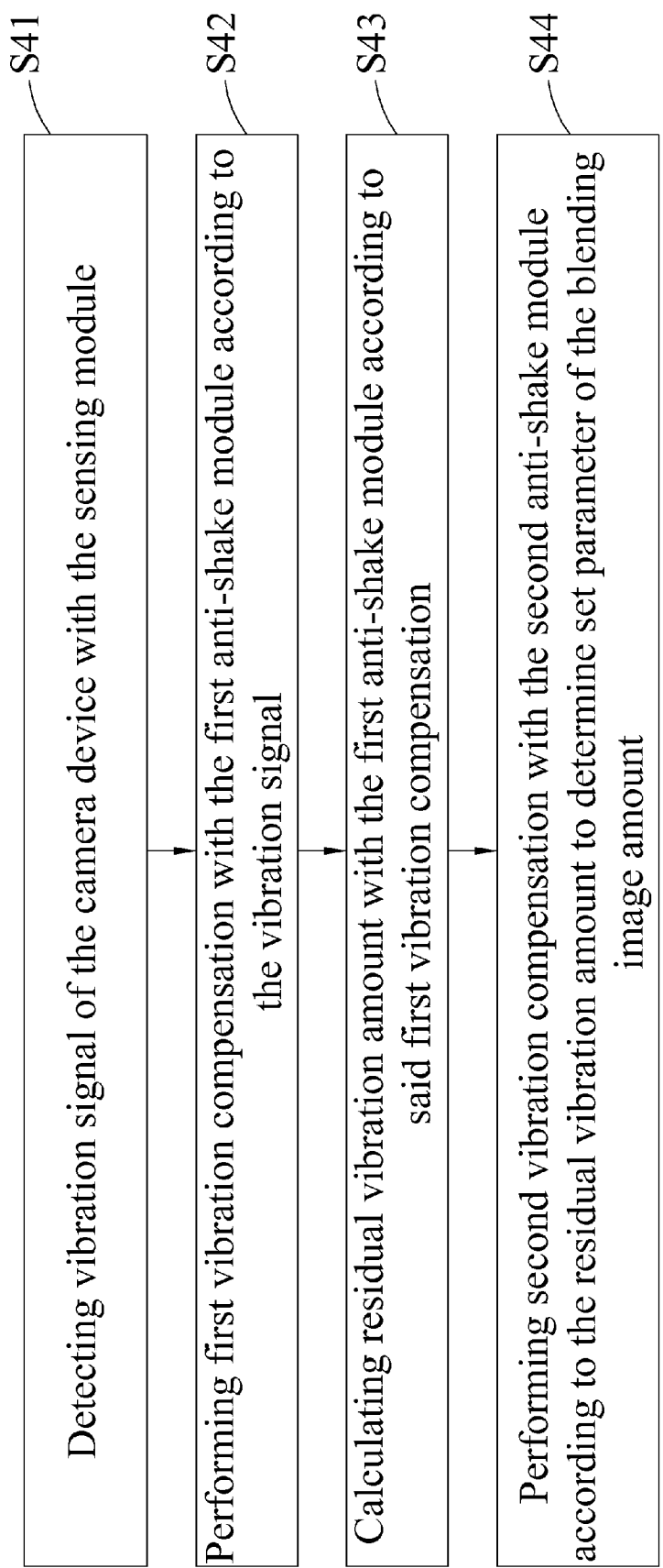
FIG. 4 is a flow chart of the multiple anti-shake method according to the present invention.

Referring to FIG. 4, the multiple anti-shake method applied to a camera device 2 comprising the steps of:

Step S41, detecting vibration signal 21 of the camera device 2 with the sensing module 11, wherein the sensing module 11 is a position sensor or an angular velocity sensor;

Step S42, performing a first vibration compensation 121 with the first anti-shake module 12 according to the vibration signal 21; and Step S43, calculating a residual vibration amount 1211 with the first anti-shake module 12 according to said first vibration compensation 121;

When the first anti-shake module 12 is an anti-shake module, it is capable of performing said first vibration compensation 121 by moving the lenses or photo-sensitive components according to the vibration signal, and therefrom further being capable of calculating the residual vibration amount 1211, the vibration amount that has not been compensated, after said first vibration compensation 121 is performed.

Step S44, performing a second vibration compensation 131 with the second anti-shake module 13 according to the residual vibration amount 1211 to determine a set parameter of the blending image amount. As the second anti-shake module 13 is a multi-frame blending module, it is capable of performing the second vibration compensation 131 by actuating multi-frame blending, and therefrom further performs an image processing according to the exposure time and blending amount to get a clear image.

Figure 5:
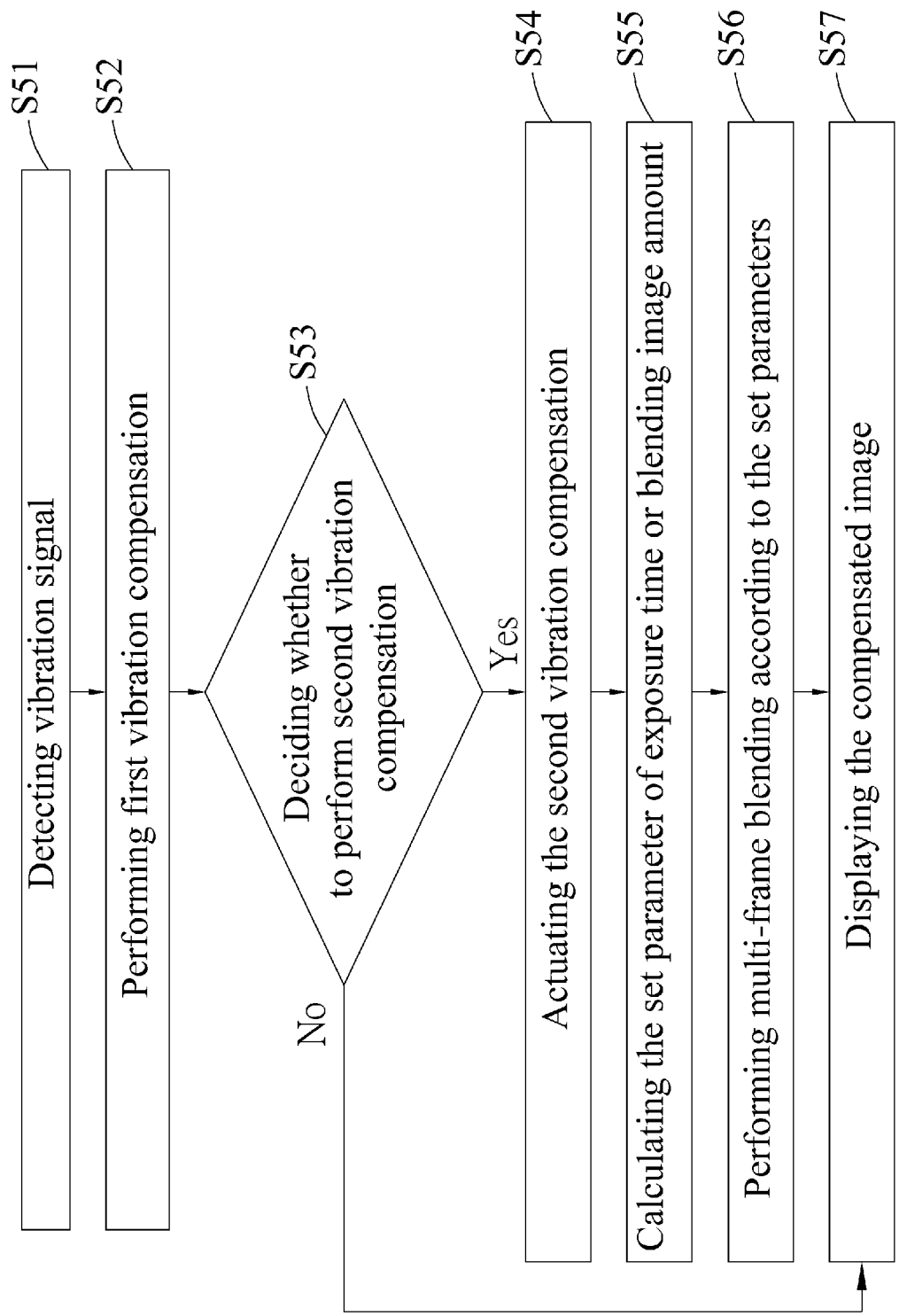
FIG. 5 is a flow chart of a first embodiment of the multiple anti-shake methods according to the present invention.

Referring to FIG. 5, the flow chart of the first preferred embodiment of the present invention, wherein the multiple anti-shake method applied to a camera device 2 comprising the steps of:

Step S51, detecting a vibration signal with a position sensor or an angular velocity sensor, wherein the vibration signal includes angular variation data and position variation data;

Step S52, performing a first vibration compensation 121 with the first anti-shake module 12, wherein the first anti-shake module 12 is an anti-shake module capable of performing said first vibration compensation 121 by moving the lenses or photo-sensitive components according to the vibration signal;

Step S53, deciding whether to perform the second vibration compensation 131 by a processor. When the compensation range of the anti-shake module is larger than that of the user's hand-shake degree, the processor actuates only the anti-shake module. If the compensation range of the first anti-shake module 12 is smaller than that of the user's hand-shake degree, the processor thereby further actuates the multi-frame blending module;

Step S54, actuating the second vibration compensation 131 by a multi-frame blending module;

Step S55, calculating the set parameter including exposure time or blending image amount;

Step S56, performing the multi-frame blending according to the set parameters; and Step S57, displaying the compensated image by a display module.

The multiple anti-shake system and the method of the present invention are capable of performing the first vibration compensation by the anti-shake module and performing the second vibration compensation according to the residual vibration amount by the multi-frame blending module. Hence, the present invention is able to get a clear image by the foregoing double vibration compensation and solve the problem of hand-shake during shooting.

While the invention has been described with reference to a preferred embodiment thereof, it is to be understood that modifications or variations may be easily made without departing from the spirit of this invention, which is defined in the appended claims.

What is claimed is:

1. A multiple anti-shake system applied to a camera device, comprising:
   a sensing module detecting a vibration signal of the camera device;
   a first anti-shake module performing a first vibration compensation being a mechanical type vibration compensation according to the vibration signal and calculating a residual vibration amount according to the first vibration compensation; and
   a second anti-shake module performing a second vibration compensation according to the residual vibration amount and determining a set parameter of multi-frame blending only when a compensation range of the first anti-shake module is smaller than that of the vibration signal of the camera device compensated in first vibration compensation;
   wherein when the compensation range of the first anti-shake module is larger than that of the vibration signal of the camera device, only the first anti-shake module is actuated.

2. The multiple anti-shake system as defined in claim 1, wherein the sensing module is a position sensor or an angular velocity sensor, and the vibration signal includes angular variation data or position variation data.

3. The multiple anti-shake system as defined in claim 1, wherein the first anti-shake module performs the first vibration compensation by moving lenses or photo-sensitive components of the camera device according to the vibration signal.

4. The multiple anti-shake system as defined in claim 1, wherein the residual vibration amount is a vibration amount that is not compensated in the first vibration compensation.

5. The multiple anti-shake system as defined in claim 4, wherein the second anti-shake module performs the second vibration compensation according to the residual vibration amount.

6. The multiple anti-shake system as defined in claim 1, wherein the set parameter includes an exposure time or a blending image amount.

7. A multiple anti-shake method applied to a camera device comprising the steps of:
   detecting a vibration signal of the camera device with a sensing module;
   performing a first vibration compensation being a mechanical type vibration compensation with a first anti-shake module according to the vibration signal;
   calculating a residual vibration amount with the first anti-shake module according to the first vibration compensation; and
   performing a second vibration compensation with a second anti-shake module according to the residual vibration amount to determine a set parameter of multi-frame blending only when a compensation range of the first anti-shake module is smaller than that of the vibration signal of the camera device compensated in first vibration compensation;
   wherein when the compensation range of the first anti-shake module is larger than that of the vibration signal of the camera device, only the first anti-shake module is actuated.

8. The multiple anti-shake method as defined in claim 7, wherein the residual vibration amount is a vibration amount that is not compensated in the first vibration compensation, and the second anti-shake module performs the second vibration compensation according to the residual vibration amount.

9. The multiple anti-shake method as defined in claim 8, wherein the set parameter includes an exposure time or a blending image amount.

10. A multiple anti-shake system applied to a camera device, comprising:
    a sensing module detecting a vibration signal of the camera device;
    an anti-shake module performing a vibration compensation being a mechanical type vibration compensation according to the vibration signal and calculating a residual vibration amount according to the vibration compensation; and
    a multi-frame blending module performing a multi-frame blending according to the residual vibration amount only when a compensation range of the anti-shake module is smaller than that of the vibration signal of the camera device;

wherein when the compensation range of the anti-shake module is larger than that of the vibration signal of the camera device, only the anti-shake module is actuated.

11. The multiple anti-shake system as defined in claim 10, wherein the multi-frame blending module further determines a set parameter of multi-frame blending.

12. The multiple anti-shake system as defined in claim 11, wherein the set parameter includes an exposure time or a blending image amount.

13. The multiple anti-shake system as defined in claim 10, wherein the anti-shake module is an optical type anti-shake module.

14. The multiple anti-shake system as defined in claim 10, wherein the residual vibration amount is a vibration amount that is not compensated in the vibration compensation.

* * * * *